(12) United States Patent
Ursell et al.

(10) Patent No.: US 12,083,655 B2
(45) Date of Patent: Sep. 10, 2024

(54) STRAIGHT EDGE CLAMP

(71) Applicant: Affinity Tool Works, LLC, Troy, MI (US)

(72) Inventors: Mike Ursell, Bloomfield Hills, MI (US); Garry Favel, Kibbitz Kadarim (IL); Tsvi Hershkovich, Karmiel (IL)

(73) Assignee: Affinity Tool Works, LLC, Troy, MI (US)

( * ) Notice: Subject to any disclaimer, the term of this patent is extended or adjusted under 35 U.S.C. 154(b) by 0 days.

(21) Appl. No.: 17/240,810

(22) Filed: Apr. 26, 2021

(65) Prior Publication Data

US 2021/0245330 A1    Aug. 12, 2021

Related U.S. Application Data

(60) Continuation of application No. 15/996,812, filed on Jun. 4, 2018, now Pat. No. 10,987,782, which is a division of application No. 14/243,935, filed on Apr. 3, 2014, now Pat. No. 10,478,947.

(60) Provisional application No. 61/807,786, filed on Apr. 3, 2013.

(51) Int. Cl.
| | |
|---|---|
| *B25B 5/02* | (2006.01) |
| *B25B 1/08* | (2006.01) |
| *B25B 1/24* | (2006.01) |
| *B25B 5/08* | (2006.01) |
| *B25B 5/16* | (2006.01) |
| *F16B 2/12* | (2006.01) |
| *F16B 2/18* | (2006.01) |

(52) U.S. Cl.
CPC ............... *B25B 5/02* (2013.01); *B25B 1/08* (2013.01); *B25B 1/2489* (2013.01); *B25B 5/085* (2013.01); *B25B 5/166* (2013.01); *F16B 2/12* (2013.01); *F16B 2/18* (2013.01)

(58) Field of Classification Search
CPC .. B25B 5/08; B25B 5/068; B25B 5/16; B25B 5/163; B25B 5/166
See application file for complete search history.

(56) References Cited

U.S. PATENT DOCUMENTS

| | | | | |
|---|---|---|---|---|
| 1,820,667 | A | | 1/1930 | Leyes |
| 2,652,080 | A | * | 9/1953 | Clauss .................. B25B 1/2473 144/307 |
| 4,394,800 | A | * | 7/1983 | Griset ...................... B25H 7/02 83/614 |
| 4,499,667 | A | * | 2/1985 | Griset .................. B23B 47/287 33/437 |

(Continued)

OTHER PUBLICATIONS

Canadian Office Action dated Nov. 16, 2022 for counterpart Application No. 3128558 (5 Pages).

*Primary Examiner* — Seahee Hong
(74) *Attorney, Agent, or Firm* — Dickinson Wright PLLC

(57) ABSTRACT

The present invention relates to a straight edge clamp that has a clamping head assembly and a stop assembly mounted upon the body of the straight edge. The head and stop are not connected together and the stop assembly is free to move with respect to the head assembly. The stop assembly has a locking assembly that allows it to be locked to the straight edge. The straight edge clamp body can include sections that are adapted to be connected together to form the overall length of the straight edge clamp.

7 Claims, 7 Drawing Sheets

(56) References Cited

U.S. PATENT DOCUMENTS

| | | | | |
|---|---|---|---|---|
| 4,516,874 | A | * | 5/1985 | Yang .................. F16B 5/126 |
| | | | | 403/313 |
| 5,324,013 | A | | 6/1994 | Marino |
| 5,348,276 | A | * | 9/1994 | Blacker ................ B25B 5/085 |
| | | | | 269/169 |
| 5,722,649 | A | * | 3/1998 | Morris ................. B25B 5/102 |
| | | | | 269/212 |
| 7,631,847 | B2 | * | 12/2009 | Harrison ............... B25H 1/04 |
| | | | | 248/316.1 |
| 10,987,782 | B2 | * | 4/2021 | Ursell .................. B25B 5/02 |
| 2005/0028395 | A1 | * | 2/2005 | Liu ...................... B25B 1/08 |
| | | | | 33/640 |
| 2005/0217128 | A1 | * | 10/2005 | Ben-Gigi ............... B25H 7/00 |
| | | | | 33/485 |
| 2006/0272744 | A1 | * | 12/2006 | Liu ..................... B23D 47/02 |
| | | | | 144/286.5 |

* cited by examiner

STRAIGHT EDGE CLAMP

CROSS-REFERENCE TO RELATED APPLICATIONS

This is a continuation of U.S. application Ser. No. 15/996,812 filed on Jun. 4, 2018, which is a divisional of U.S. application Ser. No. 14/243,935 filed on Apr. 3, 2014, which claims the benefit of U.S. Provisional Application No. 61/807,786 filed on Apr. 3, 2013, which are incorporated herein by reference in their entirety.

STATEMENT REGARDING FEDERALLY SPONSORED RESEARCH

None

TECHNICAL FIELD

This invention relates generally to a straight edge clamp and, more particularly, a straight edge clamp with a unique clamping system which reduces weight and costs and a unique connector that permits the length of the straight edge to be easily changed by the attachment or removal of sections.

SUMMARY OF THE INVENTION

In general terms, this invention provides a straight edge clamp and, more particularly, a straight edge clamp that permits the length of the straight edge to be easily changed by the attachment or removal of sections through a connector and the use of a unique clamping system which also reduces weight and costs.

The straight edge clamp of the present invention includes an elongated body, a clamping head assembly and an end stop assembly. In the preferred embodiment, the elongated body includes at least two sections and a connector for connecting the sections to form the elongated body. It should be appreciated by those of ordinary skill in the art that the number of sections connected together determines the length of the straight edge clamp. Any number of sections can be connected together; additionally, a single section can be used due to the unique head and stop assemblies.

The length of the sections in the disclosed embodiment are each approximately two feet in length and can be attached to form two, four, six, eight, ten, twelve foot, etc., straight edge clamps. The section lengths can be any other length if desired. This is a benefit since it allows a user to purchase the number of sections to form the desired length of the straight edge clamp. This also alleviates the need for the user to have a number of straight edge clamps for different jobs as is required with conventional straight edge clamps. With the straight edge clamp of the present invention, the user merely attaches the sections together to obtain the desired length. Another benefit of the sections is the straight edge clamp of the present invention is easier and less costly to ship than conventional straight edge clamps since it can be packaged in a small package, the general size of the sections. A still further benefit of the sections is that it is easier to display at the point of purchase when compared to conventional straight edge clamps. With the straight edge clamp of the present invention, the sections can be displayed with the clamping head assembly, the end stop assembly and if desired the end cap.

The elongated body has opposed edges, a top and a bottom. A main channel is formed in the bottom. The connector can be inserted into the main channel of adjoining sections to form any desired length. The clamping head assembly and the stop assembly are mounted within the main channel a spaced distance from one another. The clamping head assembly has a movable jaw that is movable in the direction of the stop assembly, from a released position to a clamped position. The stop assembly has a jaw that is movable in the direction away from said first jaw from an unlocked position to a locked position.

In the disclosed embodiment, the stop assembly can be removed and repositioned in the channel of the end section that is furthest away from the clamping head assembly. The ability to move the stop assembly to the last section, allows any number of sections to be attached to form a straight edge of desired length. The clamping head assembly and the stop assembly are not connected together allowing the stop assembly to be moved.

In use, the bottom of the elongated body is adapted to be positioned against a work surface. The work surface has sides and the clamping head assembly and stop assembly are adapted to be positioned against the sides. Once positioned, the second jaw is moved to the clamped position. In one of the disclosed embodiments, the second jaw is moved to the clamped position by rotating a handle. The first jaw is moved to the locked position upon movement of the second jaw. The second jaw pulls the elongated body in the direction away from the stop assembly, which in turn pushes the first jaw of the end stop into the locked position. As a result, the straight edge clamp is locked onto the work surface.

In a second embodiment, the stop assembly can also be moved along the elongated body. In this embodiment, the stop assembly has a rotatable lock mechanism that is rotated from the unlocked to the locked position. The locking mechanism includes engagement surfaces to engage the sidewalls of the channel. An advantage of this embodiment is that a very simple engagement member can be used in place of the clamping head assembly.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
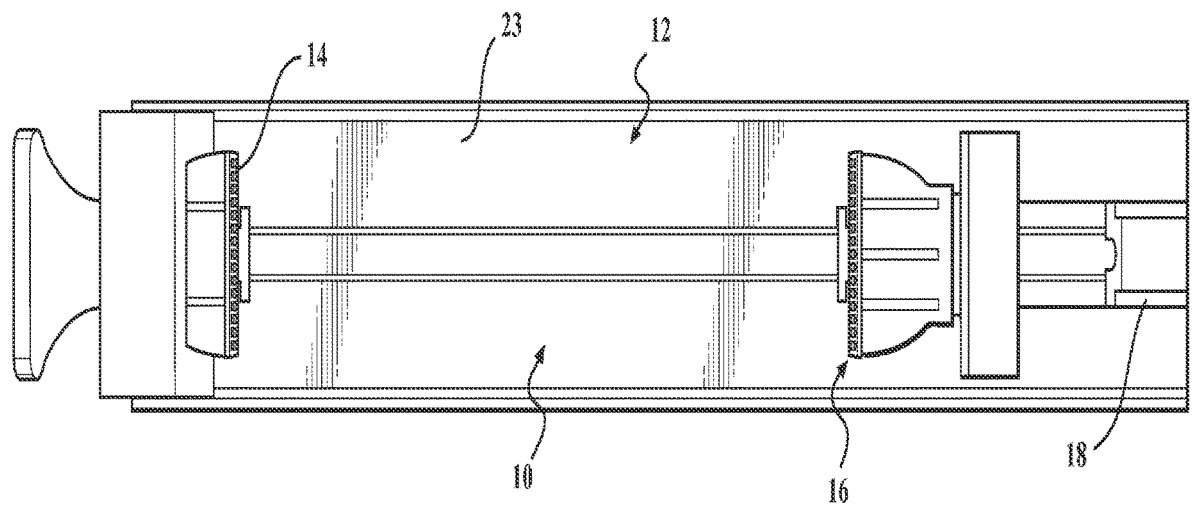
FIG. 1 is a perspective view of the underside of the first embodiment of the straight edge clamp of the present invention.

With reference to FIGS. 1 through 4, the first embodiment of the straight edge clamp of the present invention is shown generally at 10. The straight edge clamp 10 includes an elongated body 12, a clamping head assembly 14 and an end stop assembly 16. An end cap 18 is provided in the disclosed embodiment to close the end of the straight edge clamp 10.

Figure 5:
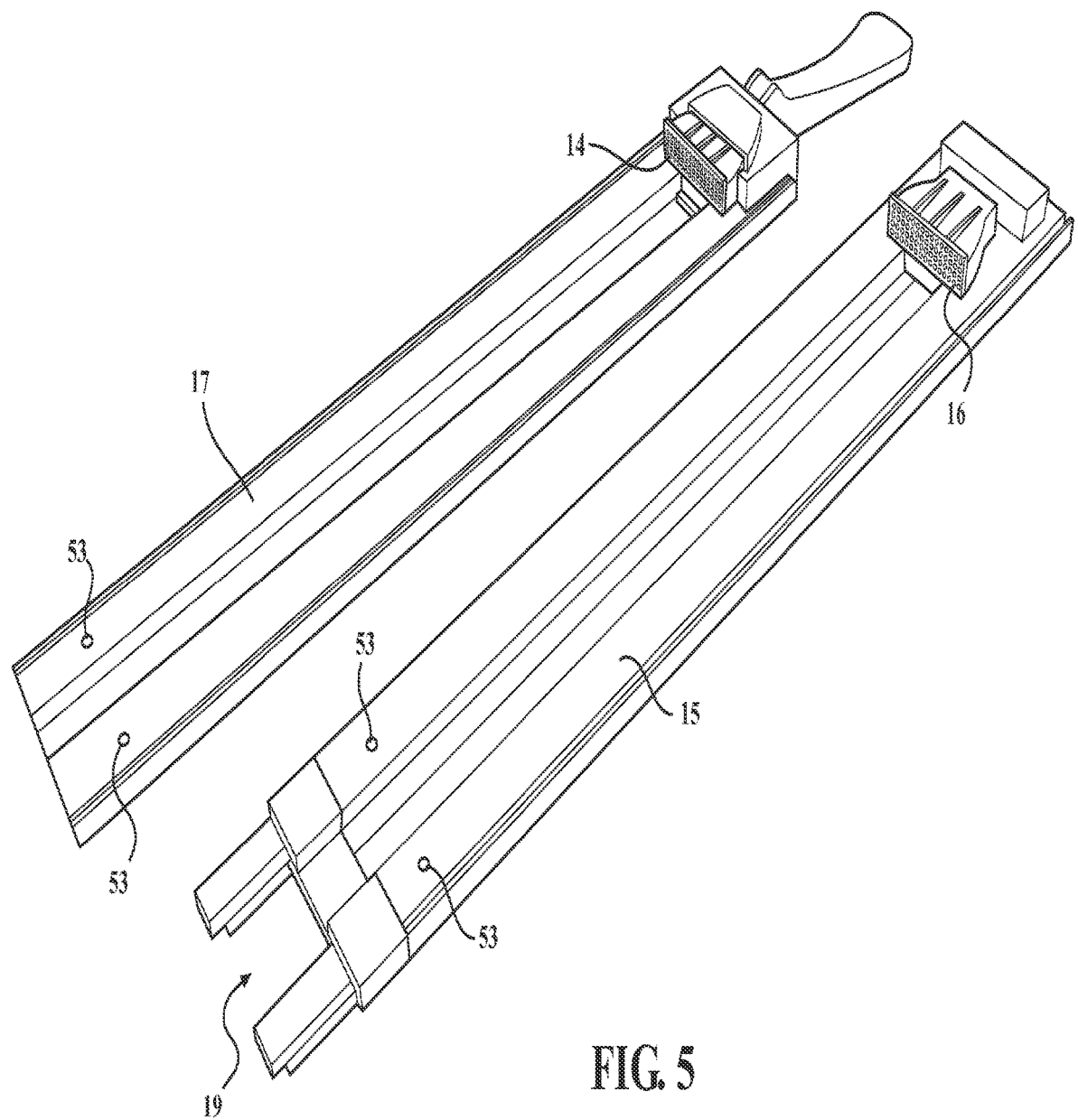
FIG. 5 is a perspective view of two sections of the first embodiment of the straight edge clamp of the present invention.
Figure 6:
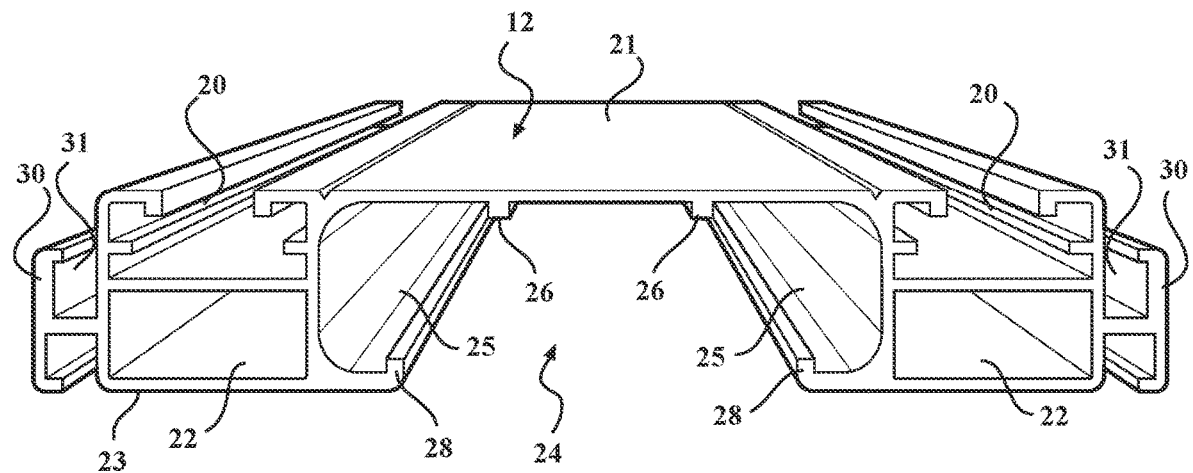
FIG. 6 is an end view of the straight edge clamp of the present invention.

With reference to FIGS. 5 and 6, the elongated body 12 includes at least two sections 15 and 17 and a connector 19 for connecting the sections 15 and 17 together to form the elongated body 12. It will be appreciated by those of ordinary skill in the art that the number of sections 15 and 17 that are connected together will determine the length of the straight edge clamp 10. By way of example, the sections in the disclosed embodiment are each approximately two feet in length and can be attached to form two, four, six, eight, ten, twelve foot etc. straight edge clamps. This allows a user to purchase the number of sections 15 and 17 to form the desired length straight edge clamp 10. This also alleviates the need for the user to have a number of straight edge clamps for different jobs. With the straight edge clamp 10 of the present invention, the user merely attaches the sections 15 and 17 to obtain the desired length. It should be appreciated by those of ordinary skill in the art that other section lengths can be used, for example 6 inches, 1 foot, 2 foot, etc.

With reference to FIG. 6, the profile of the elongated body 12 is shown. The elongated body 12 includes a top surface 21 and a bottom surface 23. The bottom surface 23 has spaced openings 22 adjoining a generally c-shaped central channel 24. In the disclosed embodiment, the central channel 24 has protrusions 26 and locator rails 28 protruding into the channel 24. There are also optional outer attachment ribs 30 and attachment grooves 31. These can be used to attach other items to the straight edge clamp 10.

Figure 7:
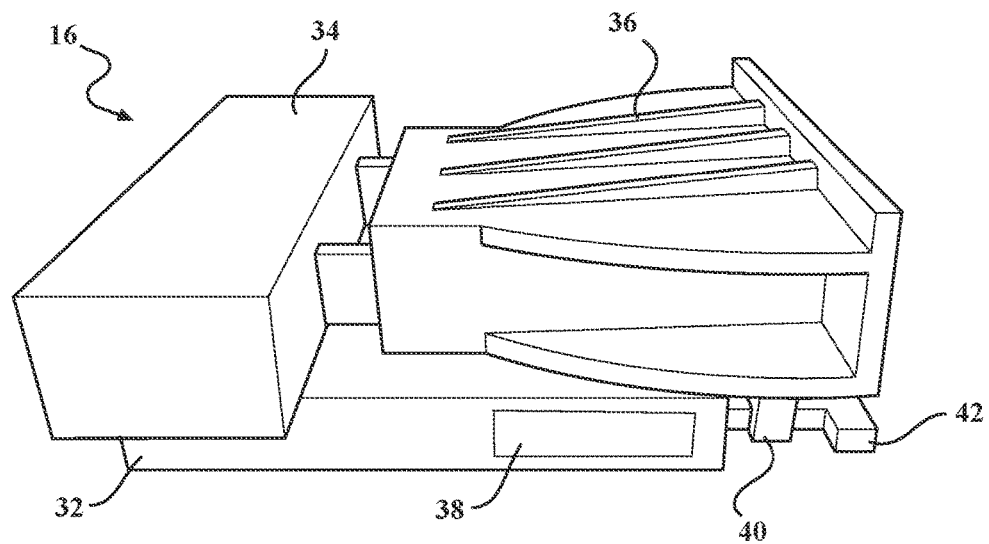
FIG. 7 is a perspective view of the end stop assembly of the first embodiment of the present invention.
Figure 8:
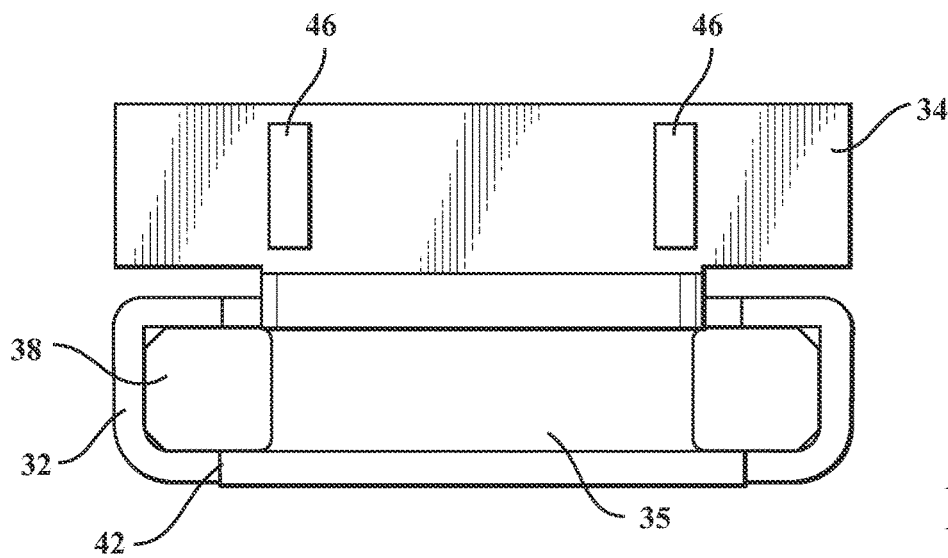
FIG. 8 is an end view of the end stop base of the first embodiment of the present invention.
Figure 9:
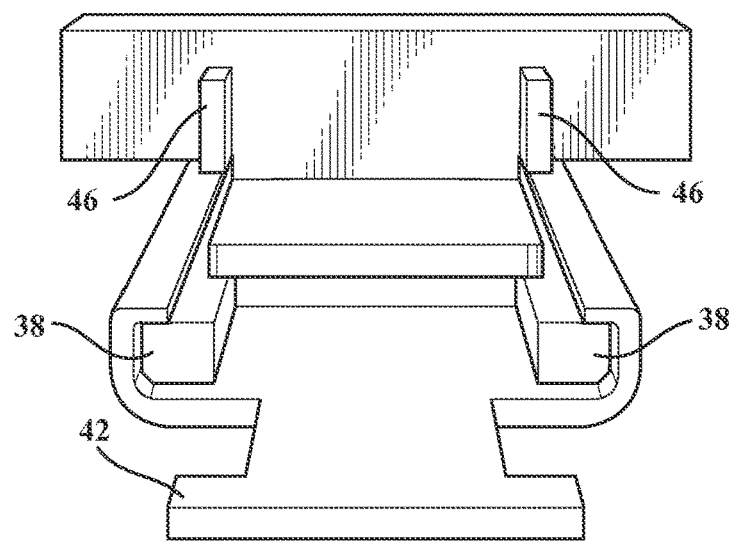
FIG. 9 is a perspective view of the end stop base of the first embodiment of the present invention.

With reference to FIG. 7, the end stop 16 will be described in greater detail. The end stop 16 has a base 32 that slides into and along the channel 24. There is a handgrip 34 on the base that facilitates the movement of the end stop along the channel 24. A first jaw 36 is movably mounted upon the base 32 and can be moved from a released position to a locked position. Clamp pads 38 are mounted within the base 32 and can be forced outwardly by the movement of the first jaw 36 to the locked position. The clamp pads 38 engage the sidewalls 25 (see FIG. 6) when the end stop 16 is in the locked position.

With reference to FIGS. 7 through 15, the first jaw 36 has limit tabs 40 that engage limit tabs 42 on the base 32. The limit tabs 42 restrict the movement of the first jaw 36 within the base 32.

The base 32 includes a passage 35 that receives a wedge member 50 extending from the first jaw 36. The wedge member 50 has angled sides that engage the clamp pads 38 and force them to the locked position when the wedge member 50 is forced into the passage 35. The wedge member is forced into the passage 35 and against the clamp pads 38, when the clamping head assembly 14 is engaged, as will be described in greater detail below. It should be appreciated by those of ordinary skill the art that the wedge member 50 could have a single side extending at an acute angle to the longitudinal center line of the straight edge body 12 and that only one clamp pad 38 would be needed.

Figure 10:
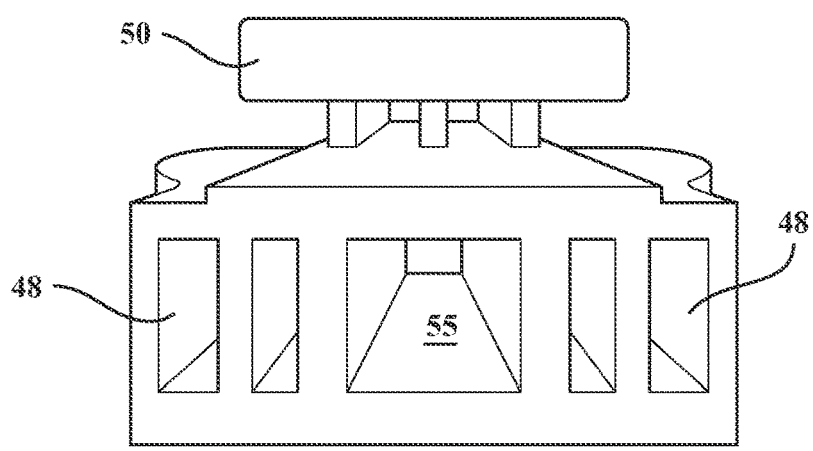
FIG. 10 is an end view of the first jaw of the first embodiment of the present invention.
Figure 11:
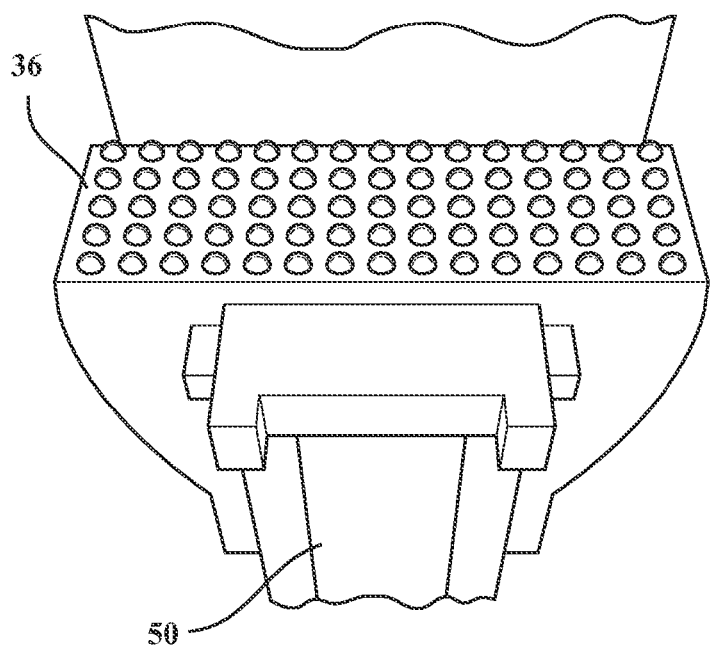
FIG. 11 is a perspective view of the first jaw of the first embodiment of the present invention.

Guide fingers 46 extend out of the base 32 and into guide finger pockets 48, see FIG. 10. The fingers 46 in the first pockets 48 align the first jaw 36 and facilitate its movement with respect to base 32. A second pocket 55 can also be provided to receive a spring to bias the first jaw 36 to the released position.

Figure 2:
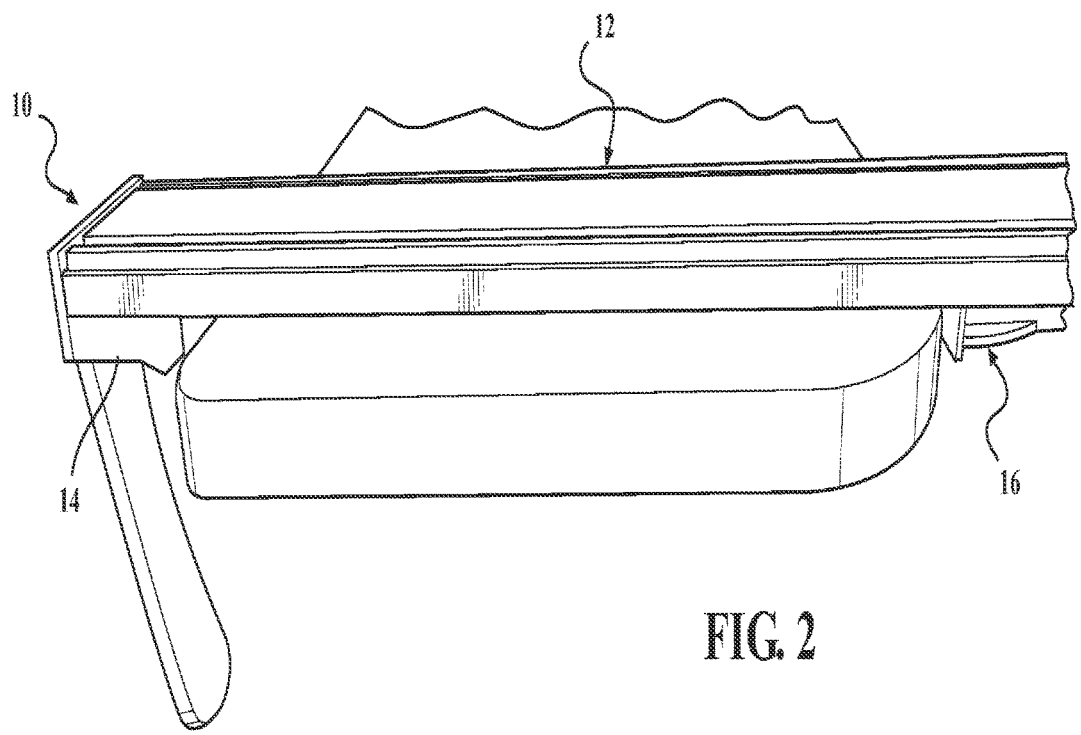
FIG. 2 is a side view of the first embodiment of the straight edge clamp of the present invention clamped to a surface.
Figure 3:
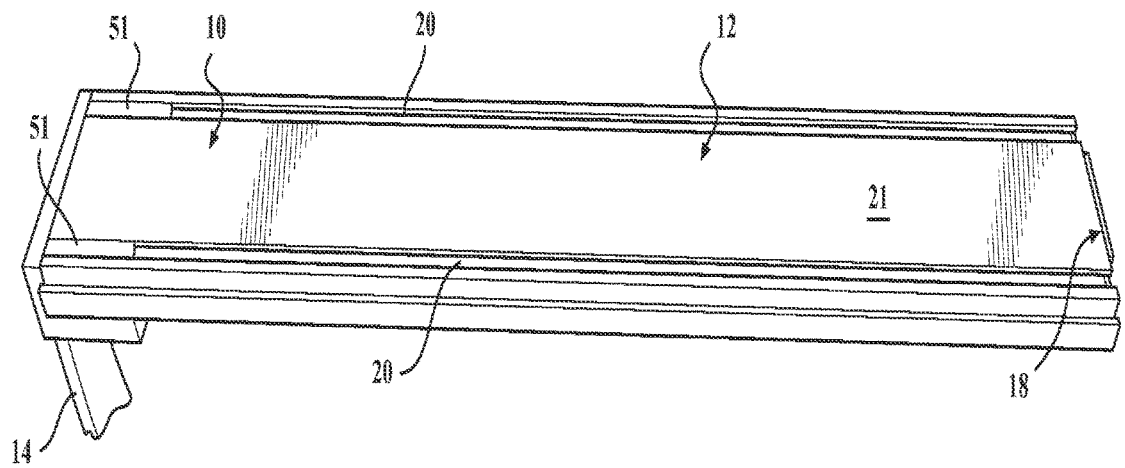
FIG. 3 is a perspective view of the first embodiment of the straight edge clamp of the present invention clamped to a surface.
Figure 4:
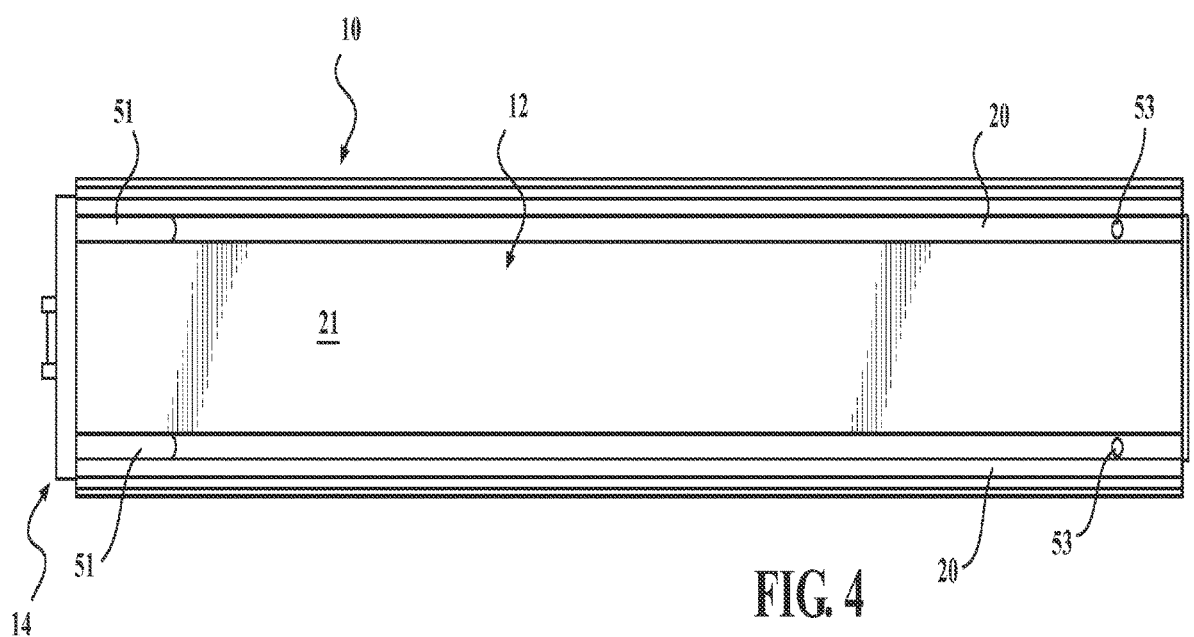
FIG. 4 is a top view of the first embodiment of the straight edge clamp of the present invention clamped to a surface.
Figure 12:
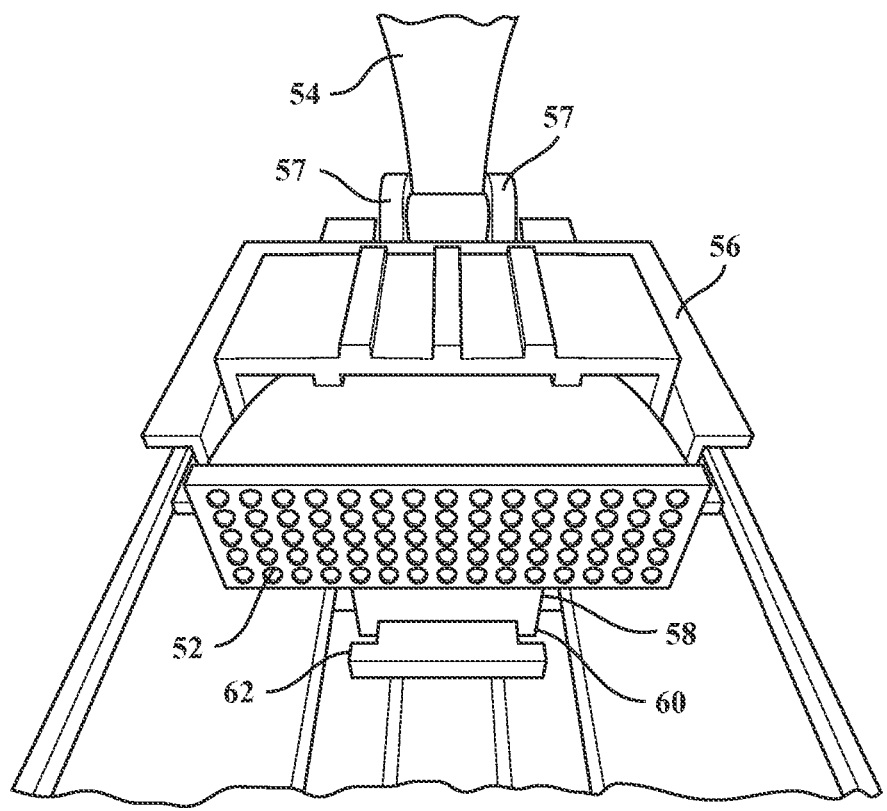
FIG. 12 is a perspective view of the clamping head assembly of the present invention.

With reference to FIG. 12, the clamping head assembly 14 will be described. The clamping head assembly 14 is fitted into the end of one of the sections 15, 17 of the elongated straight edge body 12. As shown in FIGS. 2 through 4, the clamping head assembly 14 has attachment fingers 51 that are positioned in the c-shaped tracks 20. Additionally, in the disclosed embodiment, there are apertures 53 that receive detents extending from the fingers 51. The clamping head assembly 14 also includes a mounting extension, not shown, that extends into the channel 24. In another embodiment, there are additional mounting extensions that extend into the openings 22.

The clamping head assembly includes a second jaw 52 and a clamp actuation handle 54. The second jaw 52 is movably mounted in a clamp body 56. The handle 54 includes a cam member 57 that engages and pushes the second jaw in to the direction of the stop assembly 16 when the handle 54 is rotated. Guides 58 engage the rails 28 to facilitate the movement of the second jaw 52. Limit tabs 60 and 62 limit the movement of the second jaw 52.

In use, the bottom surface 23 of the elongated body 12 is positioned against a work surface, (see FIGS. 2 through 4). The work surface has sides and the clamping head assembly 14 and stop assembly 16 are adapted to be positioned against the sides. The second jaw 52 is positioned against one side of the work surface and the end stop assembly 16 is moved to engage the first jaw 36 against the other side of the work surface. Once positioned, the second jaw 52 is moved to the clamped position. In the disclosed embodiment, the second jaw 52 is moved to the clamped position by rotating handle 54. The first jaw 36 is moved to the locked position upon movement of the second jaw 52. The second jaw 52 pulls the elongated body 12 in the direction away from the stop assembly 16, which in turn pushes the first jaw 36 of the end stop 16 into the locked position. As a result, the straight edge clamp is locked onto the work surface.

Figure 13:
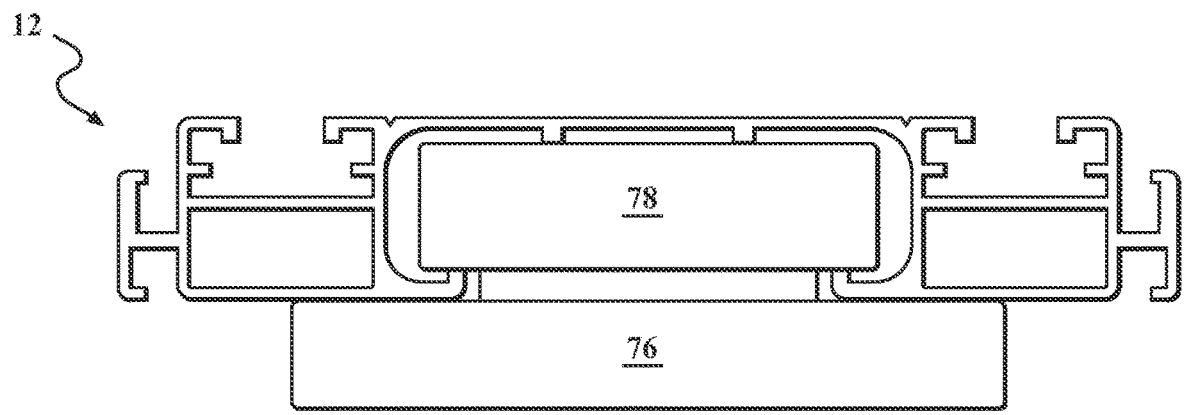
FIG. 13 is an end view of a further embodiment of the end stop of the present invention in the unlocked position.
Figure 14:
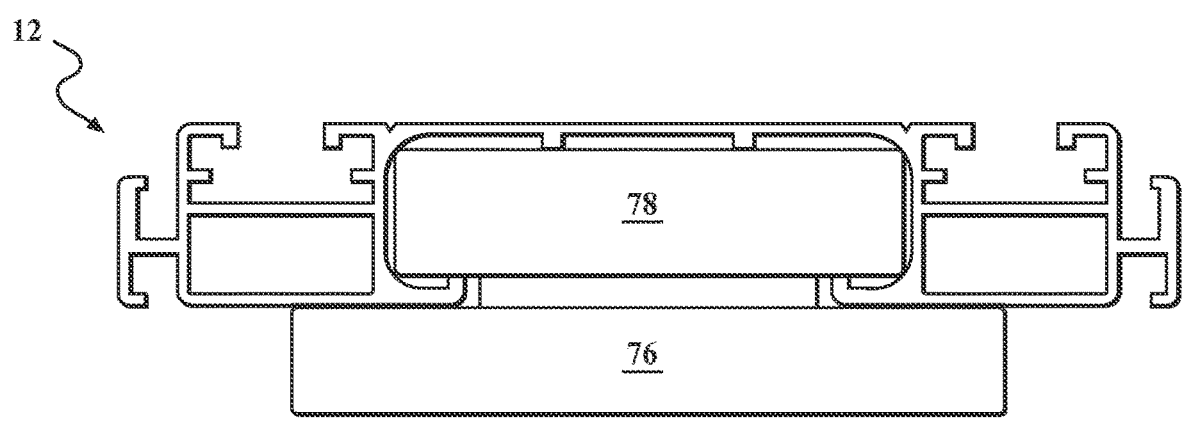
FIG. 14 is an end view of the embodiment of FIG. 13 in the locked position.
Figure 15:
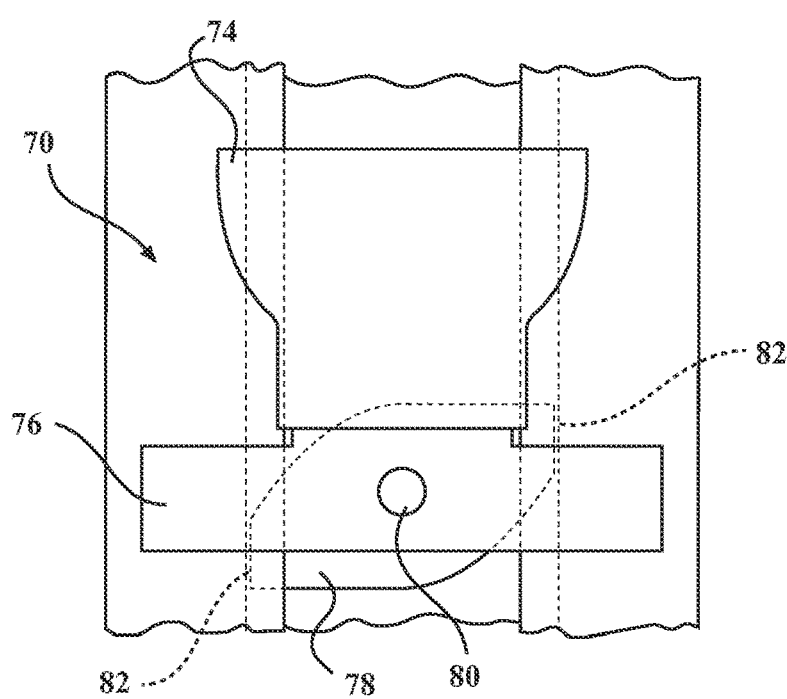
FIG. 15 is a bottom view of the end stop of FIG. 13 in the locked position.

With reference to FIGS. 13 through 15, a further embodiment of the end stop assembly 70 is illustrated. The end stop assembly 70 includes a jaw 74 and a base 76 and a rotatable locking member 78. The locking member 78 is rotatably mounted upon a pin 80. The locking member 78 includes engagement surfaces 82. As illustrated, the locking member 78 is a generally ovoid shaped member, but could have any shape that includes engagement surfaces 82 that can be rotated into contact with the sidewalls 25.

In this embodiment, the clamping head assembly can be the same as assembly 14 or it can be a simple extension from the straight edge body 12. If the clamping head is assembly 14, the assembly 14 can be positioned at one side of the work piece and the clamping head 72 is positioned against the opposite side and the locking member 78 is rotated to the locked position. The clamp actuation handle 54 can then be rotated to tightly fix the straight edge body 12 to the work surface. If a simple extension from the straight edge 12 is used, the extension is abutted against one side of the work surface and the clamping head 72 is moved along the straight edge body 12 to abut snugly against the opposite side of the work surface. Once the clamping head 72 is snugged against the opposite side, the locking member 78 is rotated to the locked position.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A straight edge clamp comprising:
   an elongated body having an open channel, said open channel having a longitudinal axis, said open channel having an inner surface extending along said longitudinal axis;
   a clamping head and an end stop, said clamping head is mounted within said open channel a spaced distance from said end stop, said end stop being adapted to engage an edge of a work surface, said clamping head being adapted to move within said open channel;
   said end stop is fixed in place to said elongated body and doesn't move along said elongated body;
   said clamping head has a locking member and a handle directly connected to said clamping head and directly controlling the movement of said locking member;
   said handle and said locking member having an axis of rotation generally perpendicular to said longitudinal axis, said locking member being rotatable by said handle about said axis of rotation between a locked position and an unlocked position;
   said locking member being located in said open channel and having an engagement surface protruding outwardly toward said inner surface whereby, in response to said handle rotation said locking member is rotated between said locked and said unlocked positions, in said unlocked position said locking member is retained in said open channel and said engagement surface is spaced apart from said inner surface and, in response to said locking member being in said locked position, said engagement surface is moved to engage said inner surface to lock an end stop assembly with respect to said elongated body.

2. The straight edge clamp of claim 1, wherein said elongated body has at least two sections and a connector for connecting said elongated body.

3. The straight edge clamp of claim 2, wherein the overall length of said elongated body is determined by the number of sections attached together by said connector.

4. The straight edge clamp of claim 3, wherein said open channel has sidewalls, said engagement surface engages said sidewalls in said locked position.

5. A straight edge clamp comprising:
   an elongated body having an open channel, said open channel having a longitudinal axis, said open channel having an inner surface extending along said longitudinal axis;
   a locking member moveable along said longitudinal axis of said open channel;
   said locking member having an axis of rotation generally perpendicular to said longitudinal axis, said locking member being rotatable about said axis of rotation between a locked position and an unlocked position;
   said locking member being located in said open channel and having an engagement surface protruding outwardly toward said inner surface whereby, in response to said locking member being in said unlocked position, said locking member is retained in said open channel and said engagement surface is spaced apart from said inner surface and, in response to said locking member being in said locked position, said engagement surface is moved to engage said inner surface to lock an end stop assembly with respect to said elongated body;
   said open channel has sidewalls, said engagement surface engages said sidewalls in said locked position.

6. The straight edge clamp of claim 5, wherein said elongated body has at least two sections and a connector for connecting said elongated body.

7. The straight edge clamp of claim 6, wherein the overall length of said elongated body is determined by the number of sections attached together by said connector.

* * * * *